No. 695,911. Patented Mar. 25, 1902.
A. A. CASLER.
BEARING FOR WASHING MACHINES.
(Application filed May 17, 1901.)
(No Model.)
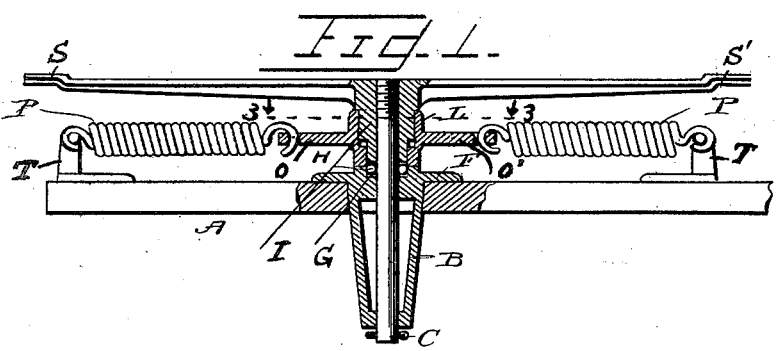
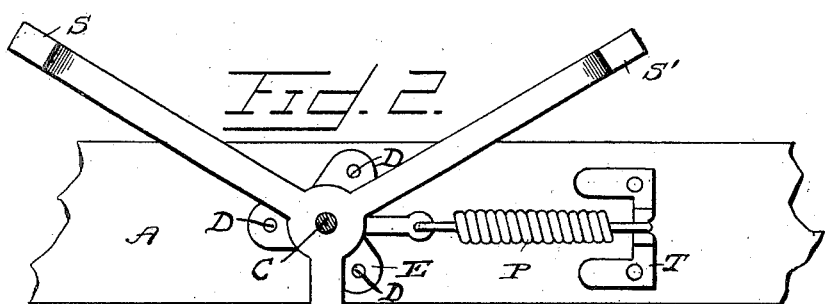
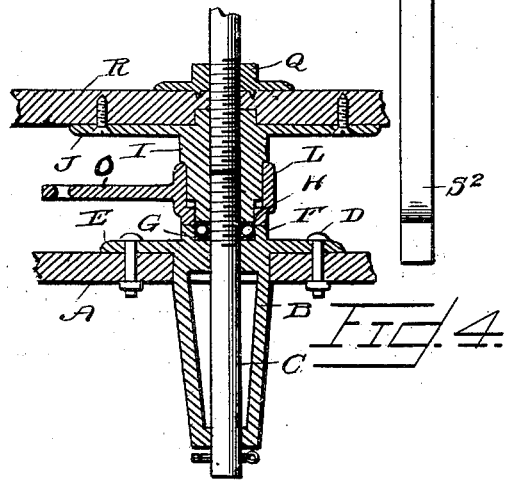
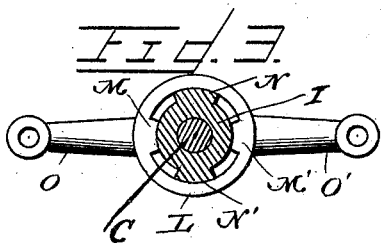
Witnesses
Alonzo A. Casler.
Inventor

UNITED STATES PATENT OFFICE.

ALONZO A. CASLER, OF MANSFIELD, OHIO, ASSIGNOR TO THOMAS B. CRARY, OF BINGHAMTON, NEW YORK.

BEARING FOR WASHING-MACHINES.

SPECIFICATION forming part of Letters Patent No. 695,911, dated March 25, 1902.

Application filed May 17, 1901. Serial No. 60,738. (No model.)

*To all whom it may concern:*

Be it known that I, ALONZO A. CASLER, a citizen of the United States, residing at Mansfield, in the county of Richland and State of Ohio, have invented certain new and useful Improvements in Bearings for Washing-Machines, of which the following is a specification.

My invention relates to improvements in bearings for washing-machines of that class wherein the tub or suds-box is mounted for rotary movement.

The object of the invention is to provide a bearing for the support of the tub and to combine therewith a system of levers and spring to check the rotation of the suds-tub and convey to the same a spring reaction by the particular construction hereinafter described, shown in the drawings, and then particularly set forth in the claim.

In the accompanying drawings, Figure 1 is a vertical sectional view of my improved bearing, showing the general construction of the same with a double spring attachment. Fig. 2 is a top plan view of the same, showing the supporting-spider with one spring attachment in place of two. Fig. 3 is a cross-section on the line 3 3 of Fig. 1 looking down in the direction of the arrows, with the springs removed, with the construction slightly modified. Fig. 4 is a vertical sectional view of the bearing enlarged, the bearing being so constructed that the suds-box can be attached rigidly to the same.

Like letters of reference indicate like parts in the different views.

In the drawings, A indicates a portion of a frame for the support of the washing-machine.

B indicates a flanged open hanger, which tapers toward the bottom and is provided with an opening through the center to receive the vertical shaft C, bolts D (not shown in Fig. 1) passing through the flange E to secure the hanger firmly upon the frame. The upper face of the hanger is provided with an upwardly-projecting rim F sufficiently large to receive a tempered-steel washer G, upon which rest the balls H. A similar tempered-steel washer is placed upon the top of the balls, and upon the same rests the lower face of the spider-hub I. The shaft C is threaded at its upper end and is screwed into the hub I. The upper portion of the hub is provided with outwardly-projecting arms or flanges J.

O indicates an arm or arms extending from a hollow center ring L, reduced at its lower end, so that the face will rest upon the top of the sleeve F, the inner periphery of the ring being provided with inwardly-projecting lugs M and M', which engage with the outwardly-projecting lugs N N', forming part of the hub I. The ring L may have one arm O, as shown in Figs. 2 and 4, or two arms O O', as in Figs. 1 and 3, the ends being perforated to receive the hooks formed upon the ends of the coil spring or springs P, as shown in Figs. 3 and 4. Screwed within the upper portion of the hub I is a vertical shaft threaded a sufficient distance to receive a flanged nut Q and to pass through the bottom of the suds-box or tub R and screw within the upper end of the hub I. This device is used when it is necessary to secure the tub firmly upon the vertical bearing; but when the tub is detachable the hub I is provided with the arms S S' $S^2$, the said arms being of sufficient length to correspond with the bottom of the suds-box, the weight being supported upon the balls H. The outer ends of the springs P are hooked upon a suitable bracket or brackets T, secured upon the frame A.

It will be understood that when the tub R is rotated a given distance the lugs N N' come in contact with the lugs M M'. A further movement actuates the ring L, actuating the spring or springs, checking the rotary motion, and conveying to the same a quick return movement.

What is claimed as new is—

A ball-bearing, comprising a lower open hanger having upon its upper end an outwardly-extending flange and a rim projecting above said flange, a hub, a series of balls within said rim, beneath said hub, a shaft surrounded by said balls and passed through the hanger and into the hub, a washer placed above said balls, and a ring embracing said hub and washer and resting on said rim, all substantially as shown and described.

In testimony whereof I affix my signature in presence of two witnesses.

ALONZO A. CASLER.

Witnesses:
R. F. BIEBER,
DOANE CAFFERT.